(12) United States Patent  
Koshi et al.

(10) Patent No.: US 7,957,602 B2
(45) Date of Patent: Jun. 7, 2011

(54) ENCODING DEVICE, DECODING DEVICE, ENCODING METHOD, DECODING METHOD, AND STORAGE MEDIUM STORING PROGRAMS THEREOF

(75) Inventors: Yutaka Koshi, Nakai-machi (JP); Shunichi Kimura, Nakai-machi (JP); Masanori Sekino, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/461,817

(22) Filed: Aug. 25, 2009

(65) Prior Publication Data  
US 2009/0317006 A1    Dec. 24, 2009

Related U.S. Application Data

(62) Division of application No. 11/320,000, filed on Dec. 29, 2005, now Pat. No. 7,602,939.

(30) Foreign Application Priority Data

Jun. 13, 2005  (JP) ................................. 2005-172037

(51) Int. Cl.  
  *G06K 9/00* (2006.01)
(52) U.S. Cl. ....................................... 382/232; 713/176
(58) Field of Classification Search .................. 382/100, 382/232, 233, 235, 236, 237, 238, 239, 248; 345/555; 348/384.1–440.1, 460, 463; 358/426.01–426.16; 708/203; 380/54, 210, 380/252, 287; 713/176; 704/200.1, 273; 381/73.1

See application file for complete search history.

(56) References Cited

U.S. PATENT DOCUMENTS

| 6,091,854 | A * | 7/2000 | Slattery et al. ................. 382/232 |
| 6,122,403 | A * | 9/2000 | Rhoads .......................... 382/233 |
| 7,206,450 | B2 * | 4/2007 | Renshaw et al. ............... 382/232 |
| 7,421,581 | B2 * | 9/2008 | Alasia et al. ................... 713/168 |
| 2002/0181025 | A1 | 12/2002 | Yamaguchi |
| 2003/0210803 | A1 | 11/2003 | Kaneda et al. |
| 2004/0114813 | A1 * | 6/2004 | Boliek et al. ................... 382/233 |
| 2004/0263911 | A1 | 12/2004 | Rodriguez et al. |
| 2006/0045357 | A1 | 3/2006 | Schwartz et al. |

FOREIGN PATENT DOCUMENTS

| JP | A-11-338780 | 12/1999 |
| JP | A-2001-94804 | 4/2001 |
| JP | A-2002-354253 | 12/2002 |

\* cited by examiner

*Primary Examiner* — Anand Bhatnagar  
(74) *Attorney, Agent, or Firm* — Oliff & Berridge, PLC

(57) ABSTRACT

An encoding device includes a binary image generation unit that generates at least two binary images from a multivalued image by applying different methods, a check image generation unit that generates a check image based on the plural binary images generated by the binary image generation unit, and a code generation unit that generates coded data by encoding at least one of the binary images generated by the binary image generation unit and the check image generated by the check image generation unit by using different methods.

7 Claims, 8 Drawing Sheets

BROWSING IMAGE

DICTIONARY

ENCODED DATA
(INDEX+POSITION)

ENCODING DEVICE, DECODING DEVICE, ENCODING METHOD, DECODING METHOD, AND STORAGE MEDIUM STORING PROGRAMS THEREOF

This is a Division of application Ser. No. 11/320,000 filed Dec. 29, 2005. The disclosure of the prior application is hereby incorporated by reference herein in its entirety.

BACKGROUND

1. Technical Field

The present invention relates to an encoding device and a decoding device which detect falsification of a document.

2. Related Art

A document is required to be in a form which can be easily handled by a user so that it is suitably compressed while holding viewability to the extent that the contents of the document can be checked. On the other hand, falsification of a document including company information and private information is required to be prevented. For this reason, considerable attention is paid to coping with both viewability and falsification prevention.

Japanese Published Unexamined Patent Application No. 2001-094804 discloses a method of removing any unnecessary image portion such as background color or offset from a color input image while preventing the image from being deteriorated.

Japanese Published Unexamined Patent Application No. 2002-354253 discloses a method of removing a background without leaving any isolate point when the background is in a halftone dot range.

In any of these methods, however, falsification detection has not been considered.

Japanese Published Unexamined Patent Application No. Hei 11-338780 discloses a method of authenticating an electronic document provided by a user using an encryption function to make a document finger print.

However, a background portion necessary for falsification detection encoded at high compressibility disappears easily.

SUMMARY

The present invention has been made from the foregoing background and provides an encoding device and a decoding device which effectively encode and decode a document to the extent that falsification can be detected.

According to an aspect of the present invention, an encoding device includes a binary image generation unit that generates at least two binary images from a multivalued image by applying different methods, a check image generation unit that generates a check image based on the plural binary images generated by the binary image generation unit, and a code generation unit that generates coded data by encoding at least one of the binary images generated by the binary image generation unit and the check image generated by the check image generation unit by using different methods.

BRIEF DESCRIPTION OF THE DRAWINGS

Embodiments of the present invention will be described in detail based on the following figures, wherein:

FIGS. 3A, 3B, 3C, and 3D are diagrams of assistance in explaining floating binarization processing performed by a binary image generation part 42 according to a first embodiment of the present invention, in which FIG. 3A illustrates the relation between input pixel values and floating threshold values, FIG. 3B illustrates a browsing binary image generated by a browsing image generation part 420, FIG. 3C illustrates a detecting binary image generated by a detecting image generation part 422, and FIG. 3D illustrates a check image generated by a logic operation part 44;

FIGS. 4A, 4B, and 4C are diagrams illustrating text area encoding performed by a browsing image encoding part 460, in which FIG. 4A illustrates a browsing binary image inputted to the browsing image encoding part 460, FIG. 4B illustrates an image dictionary created by the browsing image encoding part 460, and FIG. 4C illustrates data after text area encoding;

FIGS. 7A, 7B, and 7C are diagrams of assistance in explaining refinement decoding, in which FIG. 7A shows decoding of an area with an intermediate attribute, FIG. 7B shows the relation between an area of an auxiliary buffer and refinement decoding, and FIG. 7C shows the relation between a page buffer and refinement decoding;

DETAILED DESCRIPTION

An encoding device 2 and a decoding device 3 according to a first embodiment of the present invention will be described.

Figure 1:
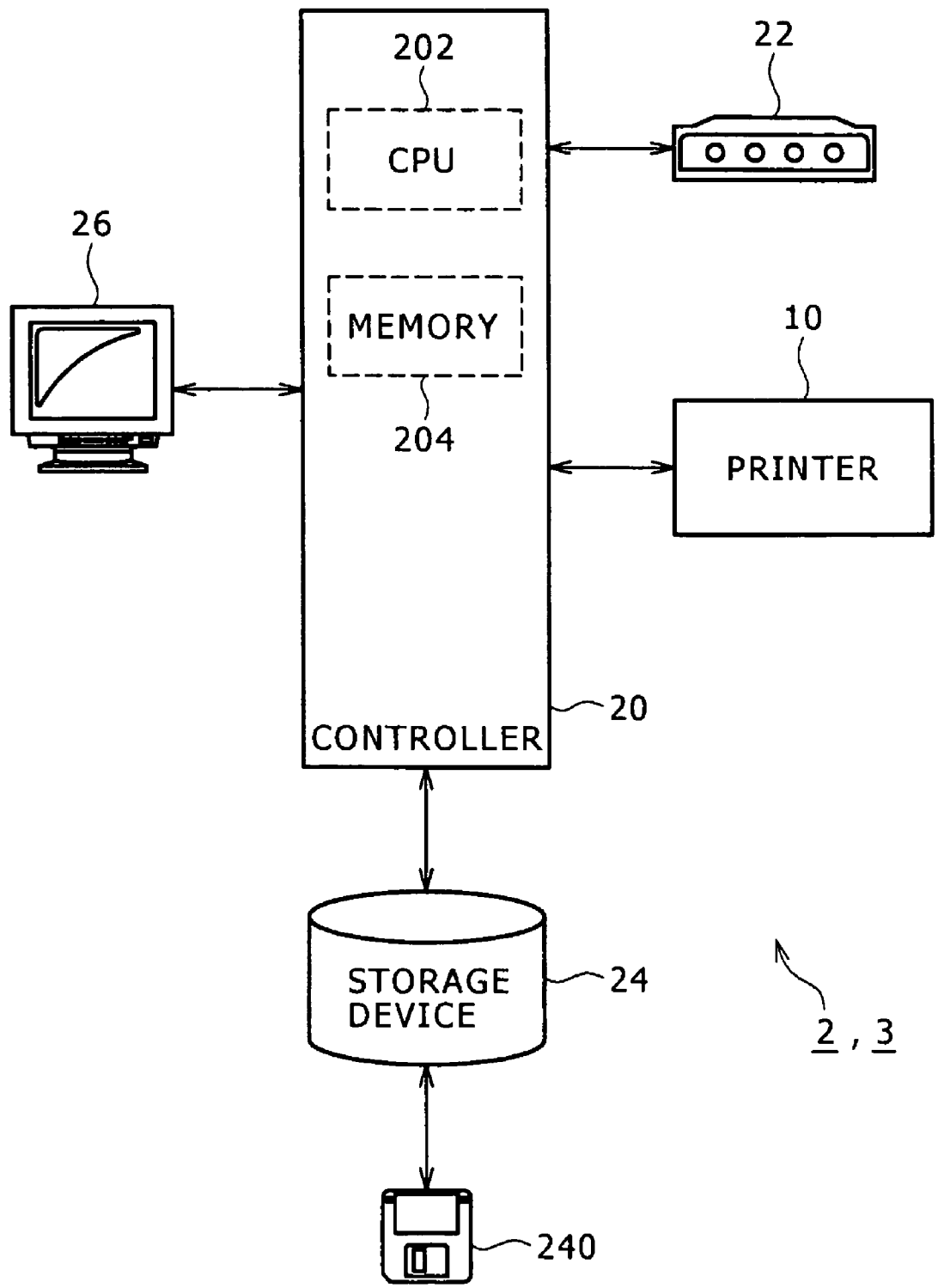
FIG. 1 is a diagram illustrating a hardware configuration of an encoding device 2 and a decoding device 3 to which an encoding method and a decoding method according to the present invention are applied, focusing on a controller 20.

FIG. 1 is a diagram illustrating a hardware configuration of the encoding device 2 and the decoding device 3 to which an encoding method and a decoding method according to the present invention are applied.

As illustrated in FIG. 1, the encoding device 2 or decoding device 3 has a controller 20 including a CPU 202 and a memory 204, a communication device 22, a storage device 24 such as an HDD and CD device, and a user interface device (UI device) 26 including an LCD display or a CRT display and a keyboard touch panel.

The encoding device 2 and the decoding device 3 are general-purpose computers on which an encoding program 4 and a decoding program 5 described later are installed as a part of a printer driver. The encoding device 2 performs predetermined encoding processing to multivalued image data inputted via the communication device 22 or the storage device 24 to generate coded data which can detect falsification. The decoding device 3 obtains the coded data form the communication device 22 via a network, not shown, or obtains the coded data stored in the storage device 24 for decoding processing to extract data which can detect whether the document is falsified or not.

Figure 2:
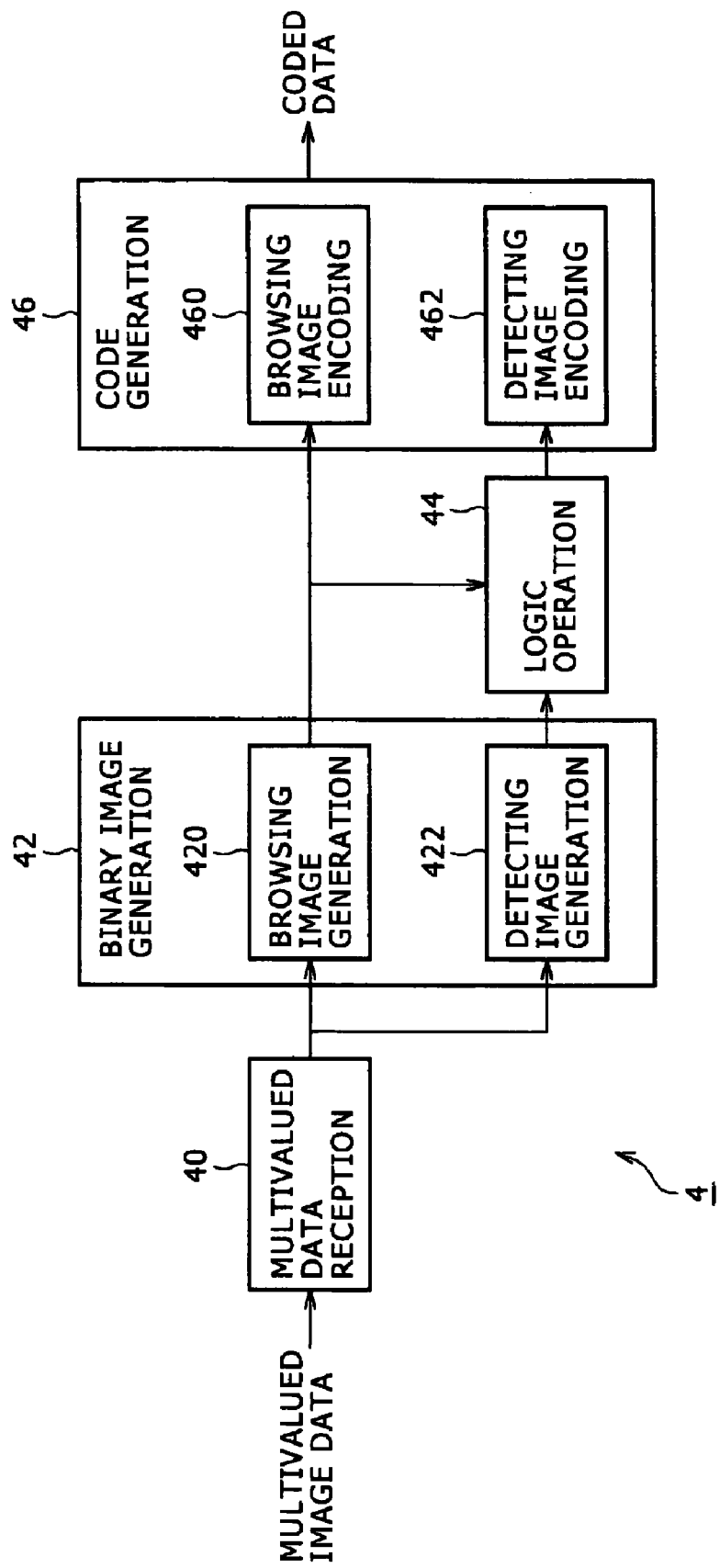
FIG. 2 is a diagram showing the functional structure of an encoding program 4 executed by the controller 20 to realize the encoding method according to the present invention.

FIG. 2 is a diagram showing the functional structure of the encoding program 4 executed by the controller 20 to realize the encoding method according to the present invention.

As shown in FIG. 2, the encoding program 4 includes a multivalued data reception part 40, a binary image generation part 42, a logic operation part 44, and a code generation part 46. The binary image generation part 42 includes a browsing image generation part 420 and a detecting image generation part 422. The code generation part 46 includes a browsing image encoding part 460 and a detecting image encoding part 462.

All or some of functions of the encoding program 4 may be realized by hardware such as ASIC provided on a printer 10.

The multivalued data reception part 40 of the encoding program 4 inputs multivalued image data obtained via the communication device 22 or the storage device 24. The multivalued data reception part 40 converts image data of the received inputted image to raster data (color component image) of each color component, performs screen processing to the raster data, and outputs the resulting data to the browsing image generation part 420 and the detecting image generation part 422 of the binary image generation part 42.

The binary image generation part 42 generates at least two binary images from the multivalued image inputted from the multivalued data reception part 40. More specifically, the binary image generation part 42 generates from the multivalued image a browsing binary image and a detecting binary image for falsification detection. The binary image generation part 42 generates two binary images from one multivalued image by applying different parameters.

The browsing image generation part 420 of the binary image generation part 42 generates a browsing binary image from a multivalued image. The browsing image generation part 420 varies a binarization threshold value according to the density (gradation value) of a pixel value within a predetermined range of the multivalued image to perform binarization processing to the multivalued image. The browsing image generation part 420 performs binarization of each pixel value to black or white according to the varied threshold value to generate a browsing binary image. The browsing image generation part 420 varies the threshold value up and down based on the pixel value of a pixel included in an image area of 5×5 pixels. The browsing image generation part 420 outputs the generated browsing binary image to the browsing image encoding part 460 of the code generation part 46 and the logic operation part 44.

The detecting image generation part 422 generates a detecting binary image from a multivalued image. The detecting image generation part 422 varies the binarization threshold value according to the density of a pixel value within a range narrower than a predetermined range in the browsing image generation part 420 to perform binarization processing to the multivalued image. The browsing image generation part 420 varies the threshold value according to a pixel value within the narrower range. A thin line such as a wrinkle of an expression of a face is easily left in the detecting binary image as compared with the browsing binary image to emphasize the shade of an object more. The detecting image generation part 422 varies the threshold value up and down based on a pixel value of a pixel included in an image area of 3×3 pixels. The detecting image generation part 422 outputs the generated detecting binary image to the logic operation part 44.

When the multivalued image has plural color component images forming color images, the browsing image generation part 420 and the detecting image generation part 422 of the binary image generation part 42 perform floating binarization processing in the respective color component images.

The floating binarization processing of the binary image generation part 42 will be described later.

The logic operation part 44 generates a check image based on a browsing binary image generated by the browsing image generation part 420 and the detecting binary image generated by the detecting image generation part 422. More specifically, the logic operation part 44 performs logic operation of the browsing binary image generated by the browsing image generation part 420 and the detecting binary image generated by the detecting image generation part 422 to generate a logic binary image so that the logic binary image is a check image. When one of pixel values of a corresponding pixel in the browsing binary image and the detecting binary image is black and the other pixel value is white, the pixel value of the pixel is black. When both pixel values are black or white, the pixel value of the pixel is white. The logic operation part 44 generates a differential image of the browsing binary image and the detecting binary image so that the generated differential image is a check image. The logic operation part 44 outputs the check image to the detecting image encoding part 462 of the code generation part 46.

The logic operation processing of the logic operation part 44 will be described later.

The code generation part 46 encodes the browsing binary image generated by the binary image generation part 42 and the binary check image generated by the logic operation part 44 using different methods. More specifically, the code generation part 46 encodes the browsing binary image by applying text area encoding or generic area encoding specified by JBIG2 and encodes the binary check image by applying refinement encoding specified by JBIG2. The code generation part 46 generates coded data from these encoded data pieces to output it to the communication device 22 or to store it in the storage device 24.

The text area encoding and the refinement encoding will be described later.

The browsing image encoding part 460 of the code generation part 46 encodes the browsing binary image by applying text area encoding or generic area encoding specified by JBIG2.

The detecting image encoding part 462 encodes the check image (logic binary image) by applying the refinement encoding specified by JBIG2.

Figure 3A:
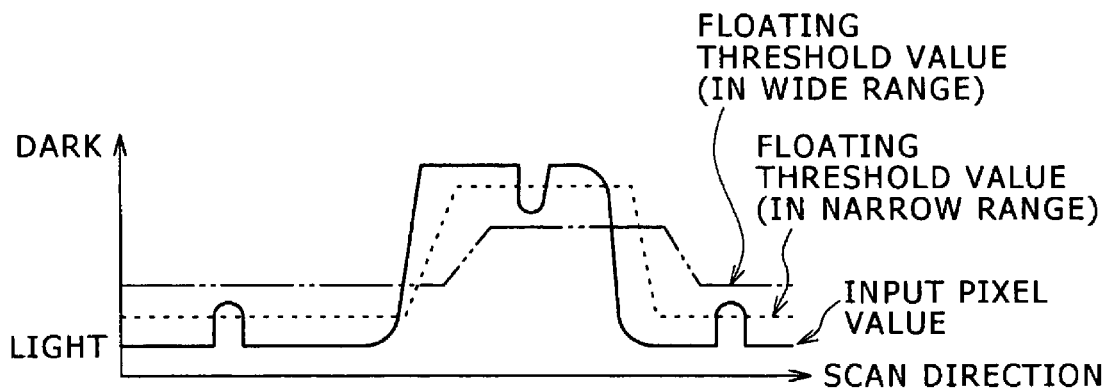
Figure 3B:
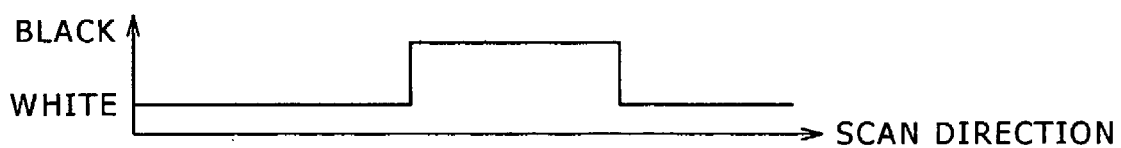
Figure 3C:
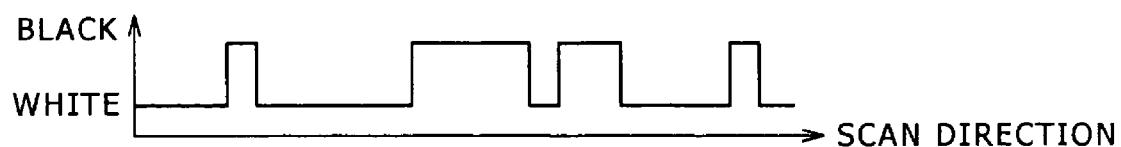
Figure 3D:
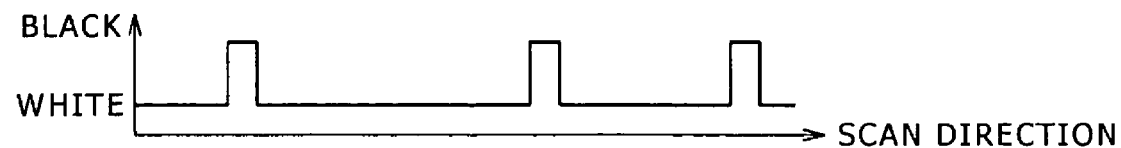

FIGS. 3A, 3B, 3C, and 3D are diagrams of assistance in explaining floating binarization processing performed by the binary image generation part 42, in which FIG. 3A illustrates the relation between input pixel values and floating threshold values, FIG. 3B illustrates a browsing binary image generated by the browsing image generation part 420, FIG. 3C illustrates a detecting binary image generated by the detecting image generation part 422, and FIG. 3D illustrates a check image generated by the logic operation part 44.

As illustrated in FIG. 3A, when a pixel value is inputted according to the scan direction, a floating threshold value varies up and down by the browsing image generation part 420 or the detecting image generation part 422. The browsing image generation part 420 varies the floating threshold value according to the pixel value of a pixel included in a predetermined range. The floating threshold value (in a wide range) varies up and down so as to follow the light and dark of the input pixel value.

The detecting image generation part 422 varies the floating threshold value according to the pixel value of a pixel included in a range narrower than a predetermined range in the browsing image generation part 420. The floating threshold value (in a narrow range) varies so as to follow the input pixel value faster than the floating threshold value (in a wide range). The varying width is larger than the varying width in the browsing image generation part 420.

As illustrated in FIG. 3B, any slight light and dark portions of a pixel value and any thin line in the browsing binary image are removed so that the browsing binary image is a binary image for browsing.

As illustrated in FIG. 3C, any thin line is left in the detecting binary image and the slight light and dark of a pixel value are expressed by black and white to be left. The detecting binary image is a binary image including detailed information.

As illustrated in FIG. 3D, a check image is generated by the logic operation part 44 in such a manner that the pixel values of a pixel which are different between the browsing binary image and the detecting binary image are black and the pixel values of a pixel which are equal therebetween are white.

The logic operation of the logic operation part 44 is not limited to operation in this example and may be a logical product (AND) operation, a logical add (OR) operation, and an exclusive-OR (XOR) operation, or a differential operation.

Figure 4A:
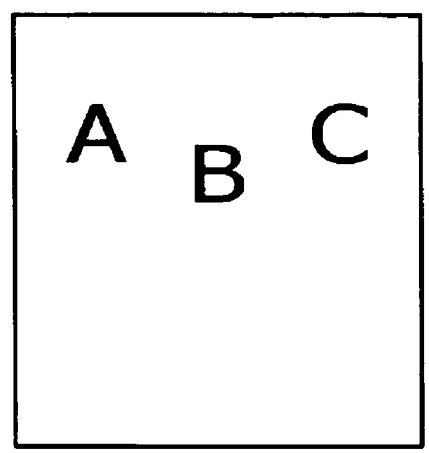
Figure 4B:
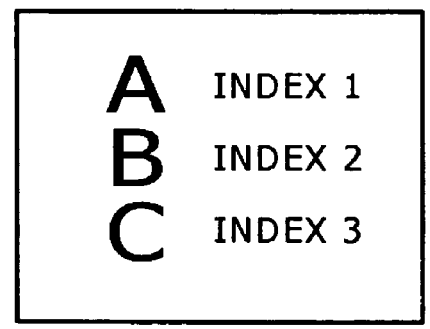
Figure 4C:
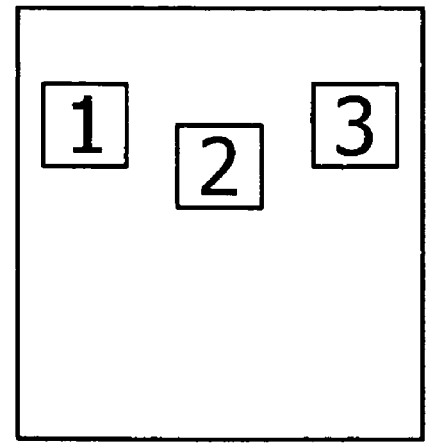

FIGS. 4A, 4B, and 4C are diagrams illustrating text area encoding performed by the browsing image encoding part 460, in which FIG. 4A illustrates a browsing binary image inputted to the browsing image encoding part 460, FIG. 4B illustrates an image dictionary created by the browsing image encoding part 460, and FIG. 4C illustrates data after text area encoding.

As illustrated in FIG. 4A, the browsing binary image has two values of black and white and any thin line is removed.

As illustrated in FIG. 4B, the browsing image encoding part 460 registers a typical pattern included in the browsing binary image into the image dictionary and gives indexes identifying these patterns to the respective patterns to complete the image dictionary.

As illustrated in FIG. 4C, the browsing image encoding part 460 compares the registered pattern with the pattern included in each color component image of the browsing binary image to generate data matching the index with the position for encoding.

The browsing image encoding part 460 may encode the browsing binary image illustrated in FIG. 4A by the generic area encoding specified by JBIG2. The generic area encoding is a method of encoding the browsing binary image without creating the image dictionary. More specifically, the generic area encoding encodes an inputted image using statistics of local pixel array (for instance, context).

The refinement area specified by JBIG2 will be described.

The JBIG2 specifies two kinds of buffers placing an image as the decoded result of an area. One of the buffers is a page buffer, which is a buffer as an output of a decoder. The other is an auxiliary buffer, which is a buffer placing intermediate data. All areas such as a text area and a generic area can have an intermediate attribute. When the area has the intermediate attribute, the decoded result is placed in the auxiliary buffer, not in the page buffer. The area placed in the auxiliary buffer can be drawn in the page buffer by using the later-described refinement area. At this time, the area of the auxiliary buffer can be simply drawn in the page buffer and can be also drawn in the page buffer after changing an image.

The detecting image encoding part 462 encodes the check image in the area having the intermediate attribute to generate data which can be decoded by using the refinement area.

Figure 5:
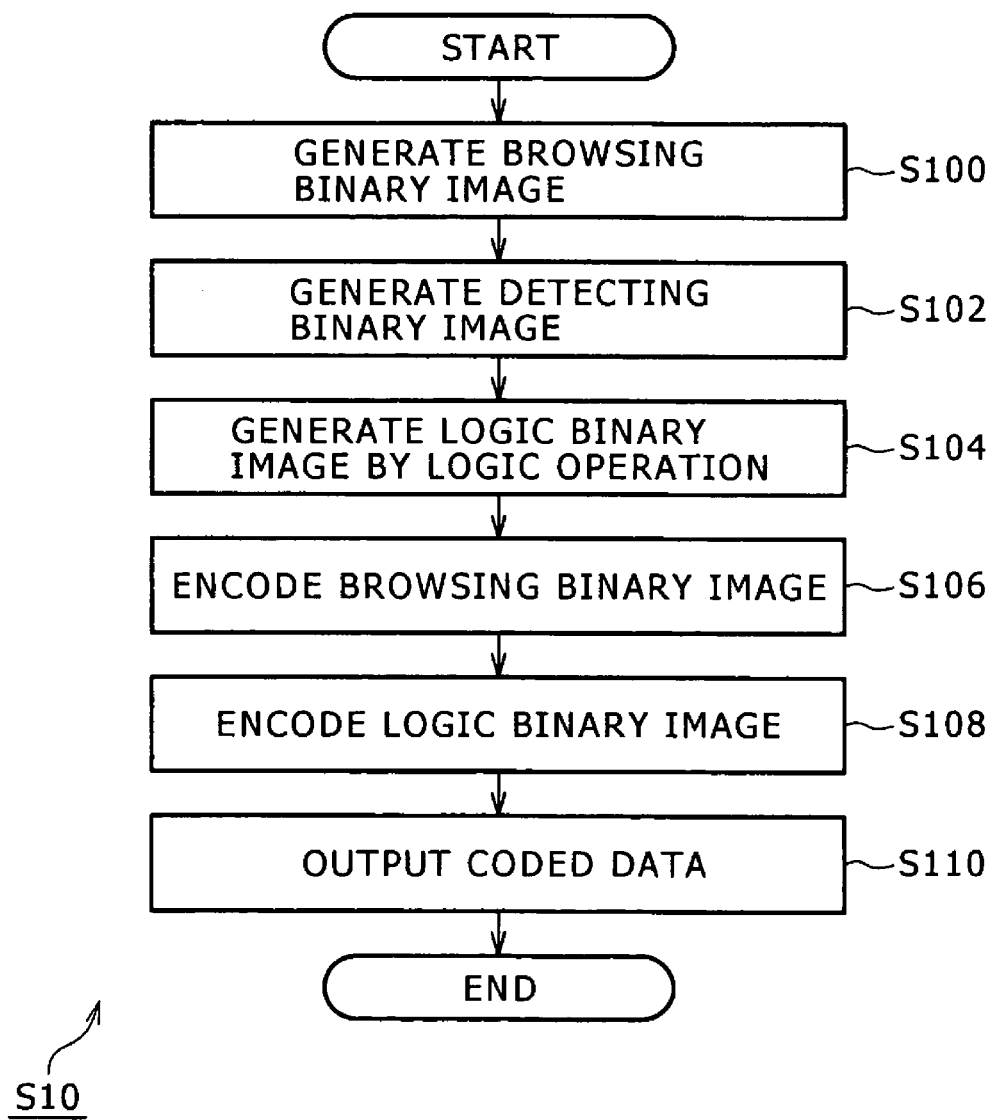
FIG. 5 is a flowchart showing encoding processing (S10) of the encoding program 4.

FIG. 5 is a flowchart showing encoding processing (S10) of the encoding program 4.

As shown in FIG. 5, in step 100 (S100), when multivalued image data is inputted, the multivalued data reception part 40 converts the multivalued image data to raster data of each color component, performs screen processing to the raster data, and outputs the resulting data to the browsing image generation part 420 and the detecting image generation part 422.

The browsing image generation part 420 varies the binarization threshold value according to the density of a pixel value within a predetermined range of the multivalued image inputted from the multivalued data reception part 40, performs binarization processing to the multivalued image, and generates a browsing binary image. The browsing image generation part 420 outputs the generated browsing binary image to the browsing image encoding part 460 and the logic operation part 44.

In step 102 (S102), the detecting image generation part 422 varies the binarization threshold value according to the density of a pixel value within a range narrower than a predetermined range in the browsing image generation part 420, performs binarization processing to the multivalued image inputted from the multivalued data reception part 40, and generates a detecting binary image. The detecting image generation part 422 outputs the generated detecting binary image to the logic operation part 44.

In step 104 (S104), the logic operation part 44 performs logic operation of the browsing binary image generated by the browsing image generation part 420 and the detecting binary image generated by the detecting image generation part 422 to generate a binary check image (logic binary image). The logic operation part 44 outputs the generated binary check image to the detecting image encoding part 462.

In step 106 (S106), the browsing image encoding part 460 encodes the browsing binary image by applying text area encoding or generic area encoding.

In step 108 (S108), the detecting image encoding part 462 refinement encodes the binary check image.

In step 110 (S110), the code generation part 46 generates coded data including respective data pieces encoded by the browsing image encoding part 460 and the detecting image encoding part 462, and outputs it to the communication device 22 or to store it in the storage device 24.

Figure 6:
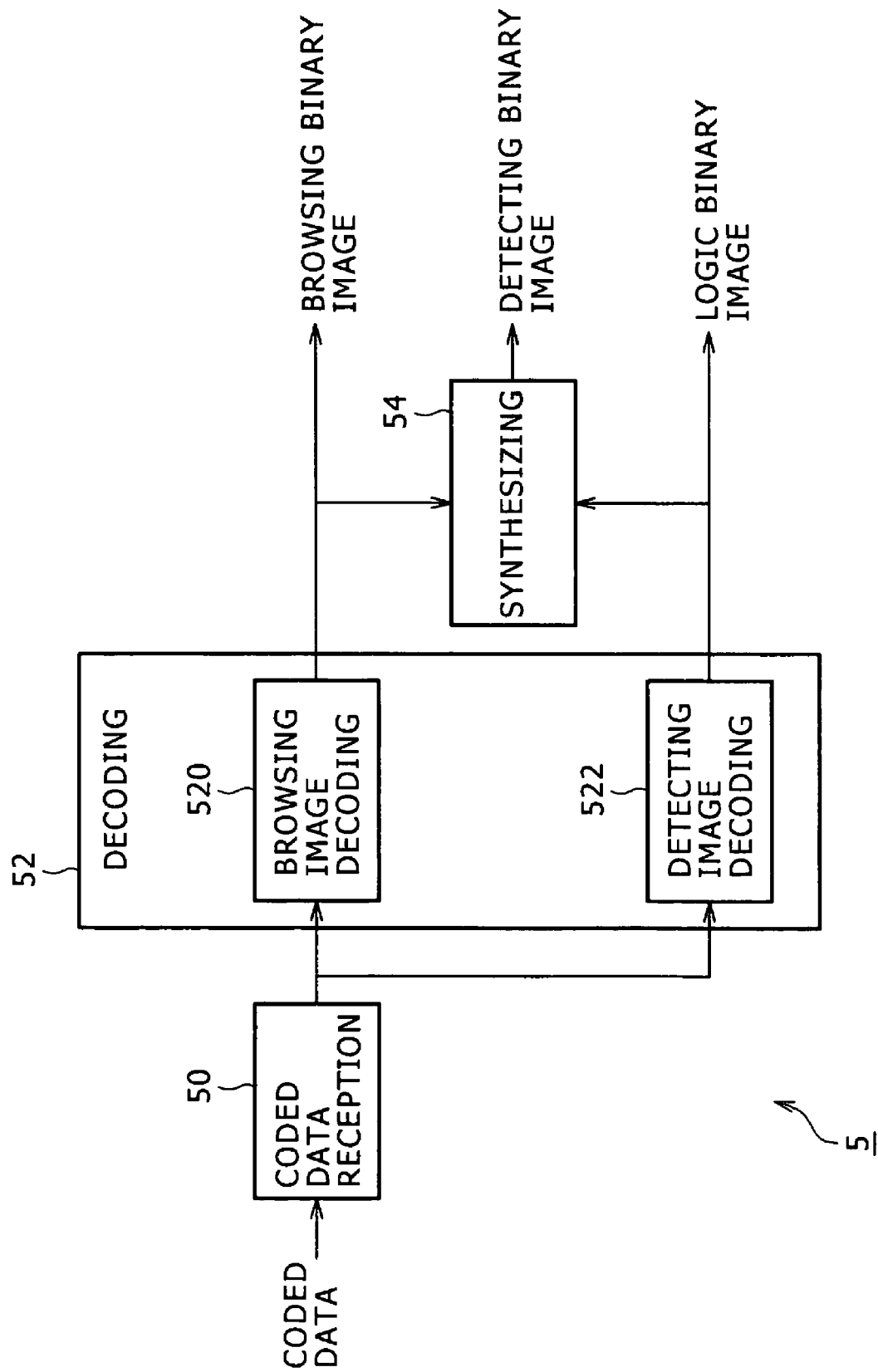
FIG. 6 is a diagram showing the functional structure of a decoding program 5 executed by the controller 20 to realize the decoding method according to the present invention.

FIG. 6 is a diagram showing the functional structure of the decoding program 5 executed by the controller 20 to realize the decoding method according to the present invention.

As shown in FIG. 6, the decoding program 5 includes a coded data reception part 50, a decoding part 52, and a synthesizing part 54. The decoding part 52 includes a browsing image decoding part 520 and a detecting image decoding part 522.

All or some of functions of the decoding program 5 may be realized by hardware such as ASIC provided on the printer 10.

The coded data reception part 50 in the decoding program 5 receives, via the communication device 22 or the storage device 24, coded data including plural image data pieces encoded by applying different methods and outputs these image data pieces to the decoding part 52. More specifically, the coded data reception part 50 receives coded data including the browsing binary image and the binary check image encoded by applying different methods, outputs the browsing binary image to the browsing image decoding part 520 of the decoding part 52, and outputs the binary check image (logic binary image) to the detecting image decoding part 522. Here, the browsing binary image is an image encoded by text area encoding or generic area encoding specified by JBIG2. The binary check image is an image encoded by applying refinement encoding.

The decoding part 52 decodes the respective image data pieces inputted from the coded data reception part 50 by different methods and outputs the respective encoded data pieces to the synthesizing part 54. More specifically, the decoding part 52 decodes the browsing binary image by applying text area decoding or generic area decoding, and decodes the binary check image by applying refinement encoding.

The decoding part 52 may decode only the browsing binary image according to image browsing and falsification detection or may detect only the binary check image.

The browsing image decoding part 520 of the decoding part 52 decodes the browsing binary image inputted from the coded data reception part 50 by applying text area decoding or generic area decoding by control of the decoding part 52, and outputs the browsing binary image to the synthesizing part 54. The browsing image decoding part 520 may output the browsing binary image to the communication device 22 or may store it in the storage device 24.

The detecting image decoding part 522 decodes the binary check image by applying refinement decoding by control of the decoding part 52 and outputs the binary check image to the synthesizing part 54. The detecting image decoding part 522 may output the binary check image to the communication device 22 or may store it in the storage device 24.

The refinement decoding will be described later.

The synthesizing part 54 synthesizes the browsing binary image (FIG. 3B) decoded by the browsing image decoding part 520 and the binary check image (FIG. 3D) decoded by the detecting image decoding part 522 to generate the detecting binary image (FIG. 3C). More specifically, the synthesizing part 54 performs an operation corresponding to the operation performed by the logic operation part 44 of the encoding program 4 (FIG. 2) to generate the detecting binary image. When one of pixel values of a corresponding pixel in the browsing binary image and the check image is black and the other pixel value is white, the pixel value of the pixel is black. When both pixel values are black or white, the pixel value of the pixel is white. The synthesizing part 54 generates the detecting binary image. The synthesizing part 54 outputs the generated detecting binary image to the communication device 22 or stores it in the storage device 24.

The logic operation of the synthesizing part 54 may be an operation corresponding to the logic operation part 44 of the encoding program 4, and without being limited to the operation in this example, may be a logical product (AND) operation or a logical add (OR) operation.

Figure 7A:
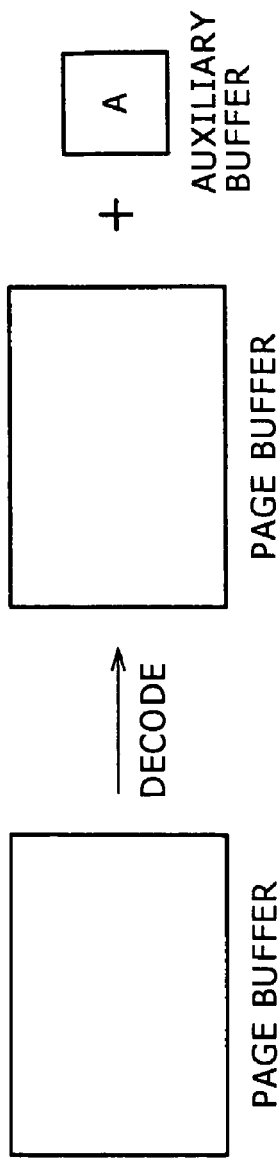
Figure 7B:
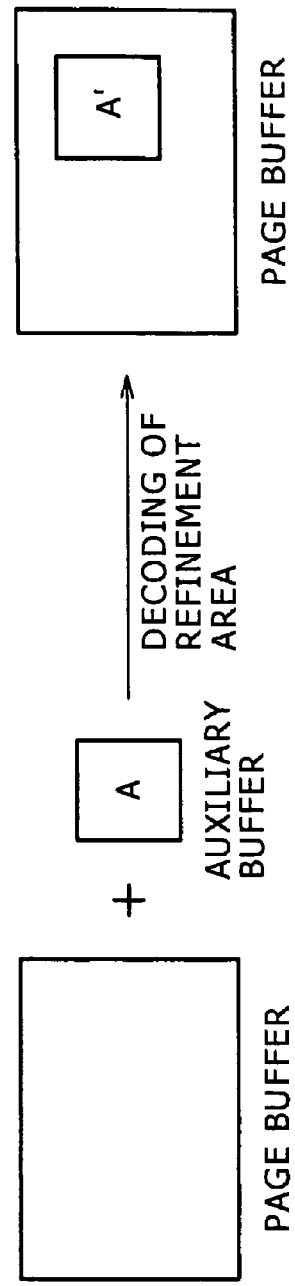
Figure 7C:
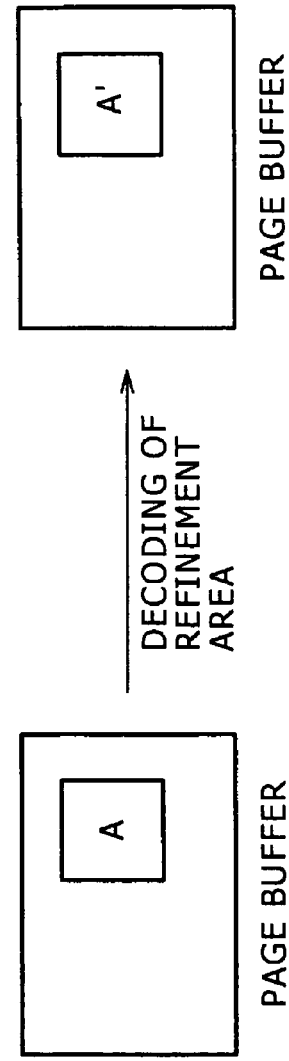

FIGS. 7A, 7B, and 7C are diagrams of assistance in explaining refinement decoding, in which FIG. 7A shows decoding of an area with an intermediate attribute, FIG. 7B shows the relation between an area of an auxiliary buffer and refinement decoding, and FIG. 7C shows the relation between a page buffer and refinement decoding.

As shown in FIG. 7A, when an area has an intermediate attribute, the decoded result is placed in the auxiliary buffer, not in the page buffer. The area placed in the auxiliary buffer can be drawn in the page buffer using the refinement area. The area of the auxiliary buffer may be directly drawn in the page buffer or may be drawn in the page buffer while changing the image.

As shown in FIG. 7B, when the refinement area is decoded to the area of the auxiliary buffer, the image placed in the auxiliary buffer is used to be drawn in the page buffer.

As shown in FIG. 7C, when the refinement area is decoded to the page buffer, the image in the page buffer is used to be drawn in the page buffer.

The area of the auxiliary buffer may be used without changing the image to be directly drawn in the page buffer.

In this case, the synthesizing part 54 synthesizes the browsing binary image and the binary check image by using the page buffer and the auxiliary buffer.

Figure 8:
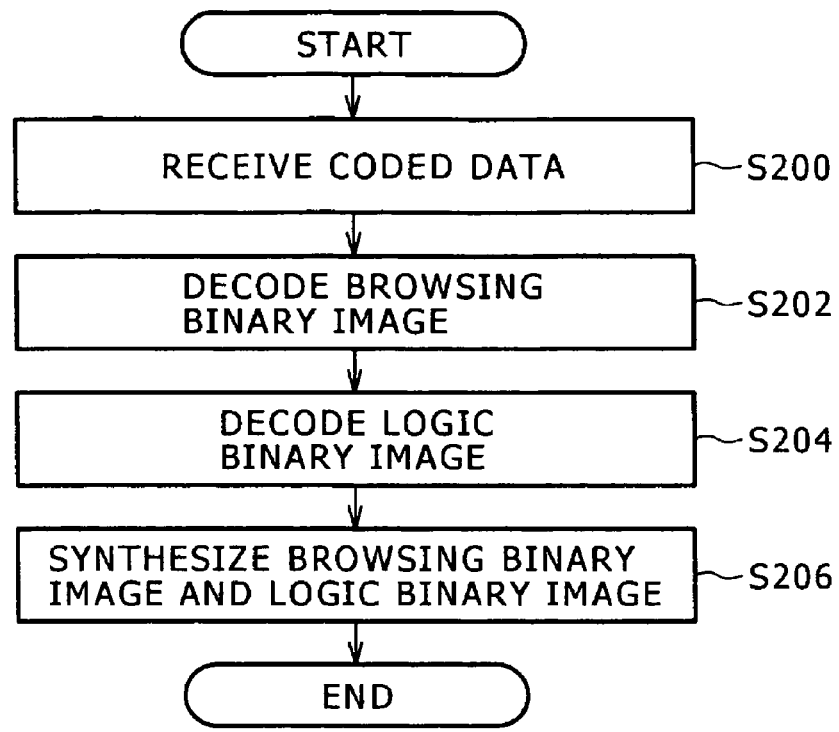
FIG. 8 is a flowchart showing decoding processing (S20) of the decoding program 5.

FIG. 8 is a flowchart showing decoding processing (S20) of the decoding program 5.

As shown in FIG. 8, in step 200 (S200), the coded data reception part 50 receives coded data including an encoded browsing binary image and binary check image, outputs the browsing binary image to the browsing image decoding part 520, and outputs the binary check image to the detecting image decoding part 522.

In step 202 (S202), the browsing image decoding part 520 decodes the browsing binary image inputted from the coded data reception part 50 by applying text area decoding or generic area decoding and outputs the browsing binary image to the synthesizing part 54. The browsing image decoding part 520 outputs the browsing binary image to the storage device 24.

In step 204 (S204), the detecting image decoding part 522 decodes the binary check image (logic binary image) by applying refinement decoding and outputs the check image to the synthesizing part 54. The detecting image decoding part 522 outputs the check image to the storage device 24.

When browsing the image, the detecting image decoding part 522 may not output the decoded check image.

In step 206 (S206), the synthesizing part 54 synthesizes the browsing binary image decoded by the browsing image decoding part 520 and the binary check image decoded by the detecting image decoding part 522 to generate a detecting binary image. The synthesizing part 54 outputs the generated detecting binary image to the storage device 24.

As described above, the encoding device 2 according to this embodiment generates at least two binary images from a multivalued image by applying different methods, generates a check image based on the plural generated binary images, and encodes at least one of the generated binary images and the check image generated by the check image generation unit by using different methods. The encoding device 2 can encode a document with viewability of the document and falsification detection. In addition, the encoding device 2 generates a browsing binary image and a detecting binary image from a multivalued image and performs logic operation of these images to generate a binary check image. Document data which permits document browsing and falsification detection at high speed. Further, the encoding device 2 encodes the browsing binary image by applying text area encoding or generic area encoding specified by JBIG2 and encodes the binary check image by applying refinement encoding. The encoding processing can be performed efficiently at high speed.

The decoding device 3 according to this embodiment receives coded data including plural image data pieces encoded by applying different methods, decodes the respective image data pieces included in the coded data by different methods, and synthesizes the decoded results. The processing speed at browsing and falsification detection can be increased. In addition, the decoding device 3 decodes the browsing binary image and the binary check image included in the received coded data. A document with viewability can be decoded and data in which falsification detection is improved can be decoded. Further, the decoding device 3 decodes the browsing binary image by applying text area decoding or generic area decoding specified by JBIG2 and decodes the binary check image by applying the refinement decoding. The decoding processing can be performed efficiently at high speed.

The encoding device 2 and the decoding device 3 according to a second embodiment of the present invention will be described.

This embodiment is different from the first embodiment in that in the encoding processing, a detecting binary image is generated by allowing a multivalued image to be a binary halftone dot image.

Figure 9:
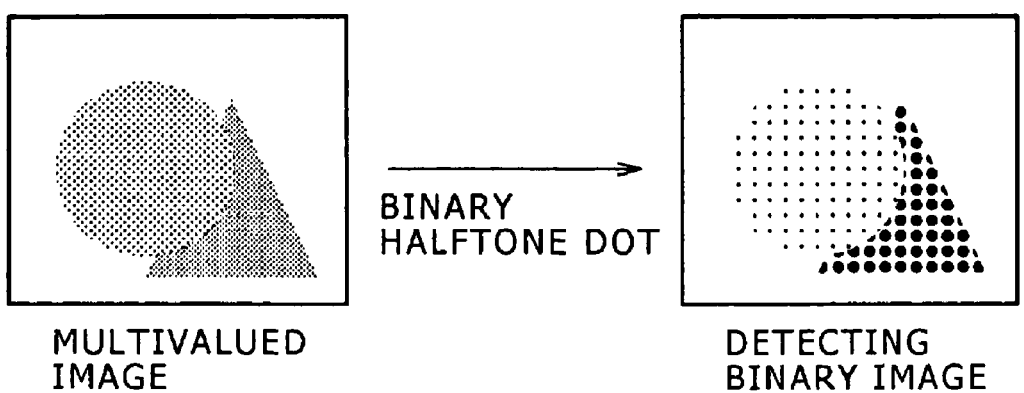
FIG. 9 is a diagram of assistance in explaining detecting binary image generating processing performed by the detecting image generation part 422 of the encoding program 4 according to a second embodiment of the present invention.

FIG. 9 is a diagram of assistance in explaining detecting binary image generating processing performed by the detecting image generation part 422 of the encoding program 4 according to this embodiment.

As shown in FIG. 9, the detecting image generation part 422 generates a binary halftone dot image according to the density of a pixel value within a predetermined range of a multivalued image inputted from the multivalued data reception part 40 so that the binary halftone dot image is a detecting binary image.

More specifically, the detecting image generation part 422 generates a detecting binary image based on a binary halftone dot image corresponding to a density value (gradation value) within a predetermined range of a multivalued image. The size of the halftone dot corresponds to the density value. In this manner, the detecting image generation part 422 forms a binary halftone dot image which can express gradation in a pseudo manner from a multivalued image so that the binary halftone dot image is a detecting binary image.

As described above, the encoding device 2 according to this embodiment generates a binary halftone dot image according to the density of a pixel value within a predetermined range of a multivalued image so that the binary halftone dot image is a detecting binary image which can be efficiently encoded. In falsification detection, the decoding program 5 outputs a binary halftone dot image. Whether a document is falsified or not can be easily detected.

The encoding device 2 may embed time stamp information into at least one of the generated browsing binary image and detecting binary image. The encoding device 2 embeds time stamp information of creation date and time or issuing data and time of a document as falsification detection data into the background of an image. The encoding device 2 embeds time stamp information into the background of an image by embedding an image pattern not viewed by a human.

The decoding device 3 may compare a synthesized and generated detecting binary image with a detecting binary image generated from image data previously stored as an original in the storage device 24 and detect whether a document is falsified or not. In falsification detection, the decoding device 3 may compare a decoded binary check image (logic binary image) with a binary check image generated from the previously stored image data and detect document falsification. Further, the decoding device 3 may detect document falsification by using time stamp information embedded into the browsing binary image and the detecting binary image.

As described above, an encoding device according to the present invention includes a binary image generation unit that generates at least two binary images from a multivalued image by applying different methods; a check image generation unit that generates a check image based on the plural binary images generated by the binary image generation unit; and a code generation unit that generates coded data by encoding at least one of the binary images generated by the binary image generation unit and the check image generated by the check image generation unit by different methods.

The binary image generation unit may include a browsing image generation unit that generates a browsing binary image from a multivalued image, and a detecting image generation unit that generates a detecting binary image from a multivalued image.

The browsing image generation unit may vary a binarization threshold value according to the density of a pixel value within a predetermined range of a multivalued image.

The detecting image generation unit may vary a binarization threshold value according to the density of a pixel value within a range narrower than a predetermined range in the browsing image generation unit.

The detecting image generation unit may generate a binary halftone dot image according to the density of a pixel value within a predetermined range of a multivalued image so that the binary halftone dot image is the detecting binary image.

The check image generation unit may perform logic operation of the browsing binary image generated by the browsing image generation unit and the detecting binary image generated by the detecting image generation unit to generate a binary check image.

The code generation unit may include a browsing image encoding unit that encodes the browsing binary image generated by the browsing image generation unit, and a detecting image encoding unit that encodes the check image generated by the check image generation unit.

The browsing image encoding unit may apply text area encoding or generic area encoding specified by JBIG2.

The detecting image encoding unit may apply refinement encoding specified by JBIG2.

A decoding device according to the present invention has a reception unit that receives coded data including plural image data pieces encoded by applying different methods, an image decoding unit that decodes respective image data pieces included in the coded data received by the reception unit by different methods, and a synthesizing unit that synthesizes the images decoded by the image decoding unit.

The reception unit may receive coded data including a browsing binary image and a binary check image encoded by applying different methods.

The image decoding unit may include a browsing image decoding unit that decodes the browsing binary image included in coded data received by the reception unit, and a detecting image decoding unit that decodes the binary check image included in coded data received by the reception unit.

The browsing image decoding unit may apply text area decoding or generic area decoding specified by JBIG2.

The detecting image decoding unit may apply refinement area decoding specified by JBIG2.

The synthesizing unit may synthesize the browsing binary image decoded by the browsing image decoding unit and the binary check image decoded by the detecting image decoding unit.

An encoding method according to the present invention generates at least two binary images from a multivalued image by applying different methods, generates a check image based on the plural generated binary images, and generates coded data by encoding at least one of the generated binary images and the generated check image using different methods.

A decoding method according to the present invention receives coded data including plural image data pieces encoded by applying different methods, decodes the respective image data pieces included in the received coded data by different methods, and synthesizes the decoded images.

A storage medium readable by a computer, storing a first program according to the present invention, allows an encoding device including a computer to execute generating at least two binary images from a multivalued image by applying different methods, generating a check image based on the plural generated binary images, and generating coded data by encoding the generated binary image, at least one of the generated binary images and the generated check image by using different methods.

A storage medium readable by a computer, storing a second program according to the present invention, allows a decoding device including a computer to execute receiving coded data including plural image data pieces encoded by applying different methods, decoding the respective image data pieces included in the received coded data by different methods, and synthesizing the decoded images.

According to an encoding device and a decoding device of the present invention, a document can be effectively encoded and decoded to the extent that falsification can be detected.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-172037 filed on Jun. 13, 2005 including specification, claims, drawings and abstract is incorporated herein by reference in its entirety.

What is claimed is:

1. A decoding device comprising:
  a reception unit that receives coded data including a plurality of image data pieces encoded by applying different methods;
  an image decoding unit that decodes the respective image data pieces included in the coded data received by the reception unit by different methods; and
  a synthesizing unit that synthesizes the images decoded by the image decoding unit,
  wherein the reception unit receives coded data including a browsing binary image and a binary check image encoded by applying different methods.

2. The decoding device according to claim 1, wherein the image decoding unit comprises:
  a browsing image decoding unit that decodes the browsing binary image included in the coded data received by the reception unit; and
  a detecting image decoding unit that decodes the binary check image included in the coded data received by the reception unit.

3. The decoding device according to claim 2, wherein the browsing image decoding unit applies text area decoding or generic area decoding specified by JBIG2.

4. The decoding device according to claim 3, wherein the detecting image decoding unit applies refinement area decoding specified by JBIG2.

5. The decoding device according to claim 2, wherein the synthesizing unit synthesizes the browsing binary image decoded by the browsing image decoding unit and the binary check image decoded by the detecting image decoding unit.

6. A decoding method comprising:
  receiving coded data including a plurality of image data pieces encoded by applying different methods;
  decoding the respective image data pieces included in the received coded data by different methods; and
  synthesizing the decoded images,
  wherein the received coded data includes a browsing binary image and a binary check image encoded by applying different methods.

7. A non-transitory storage medium readable by a computer, the storage medium storing a program of instructions executable by the computer to perform a function for decoding, the function comprising:
  receiving coded data including a plurality of image data pieces encoded by applying different methods;
  decoding the respective image data pieces included in the received coded data by different methods; and
  synthesizing the decoded images,
  wherein the received coded data includes a browsing binary image and a binary check image encoded by applying different methods.

* * * * *